United States Patent [19]
Hoskins

[11] Patent Number: 5,872,978
[45] Date of Patent: Feb. 16, 1999

[54] METHOD AND APPARATUS FOR IMPROVED TRANSLATION OF PROGRAM DATA INTO MACHINE CODE FORMAT

[75] Inventor: Asher J. Hoskins, Reigate, England

[73] Assignee: U.S. Philips Corporation, New York, N.Y.

[21] Appl. No.: 770,029

[22] Filed: Dec. 19, 1996

[30] Foreign Application Priority Data

Dec. 21, 1995 [GB] United Kingdom .................. 9526129

[51] Int. Cl.⁶ .................................................. G06F 9/45
[52] U.S. Cl. ........................................................ 395/707
[58] Field of Search ...................... 364/DIG. 1 MS File, 364/DIG. 2 MS File; 395/376, 708, 705, 800.29, 707

[56] References Cited

U.S. PATENT DOCUMENTS 5,586,328 12/1996 Caron et al. ............................. 395/705

FOREIGN PATENT DOCUMENTS

0510616A2 10/1992 European Pat. Off. .......... G06F 9/45

Primary Examiner—Robert B. Harrell
Attorney, Agent, or Firm—David R. Treacy; Gregory L. Thorne

[57] ABSTRACT

A method and apparatus for generating and distributing program code written initially in terms of a virtual processor (at authoring suite 10–18) and then translated (24) to the native code of a target processor (26) system. In order to improve efficiency, the virtual machine code includes pseudo-instruction generated and inserted in the code stream by the compiler stage (18) of the authoring suite. These pseudo-instruction are not translated to the native code of the target processor but instead provide guidance other than selection of registers for the operation of the translation process (24) to improve its efficiency.

19 Claims, 2 Drawing Sheets

METHOD AND APPARATUS FOR IMPROVED TRANSLATION OF PROGRAM DATA INTO MACHINE CODE FORMAT

BACKGROUND OF THE INVENTION

The present invention relates to methods for encoding and decoding program code according to a first data format for use by apparatuses supporting modified versions of that format, and also to a receiver or decoder apparatus employing such methods.

Such methods may be used to provide a common format for the transmission and exchange of data (for example audio and video data and/or programming commands) between the products of different manufacturers, or between products supporting differing formats but having such a common format defining a basic level of shared functionalities. The common format data is in the form of program code written for an imaginary processor which is then translated into the native code of the processor it is to finally run on in the target or receiving apparatus.

Titles written according to the common data format will include both an application program and data for use by that program, with the format specifying the environment in which the application program will run and the form in which the data, including the application program itself, is distributed. The titles themselves will be distribution medium independent, such that the application may be constructed with little or no knowledge of the distribution medium up until a mastering stage where it is committed to a particular one of a number of distribution formats (for example via data network or on optical disc) consistent with the common format. The only cases where knowledge of the distribution medium may be required in advance of the mastering stage is where the application needs to know distribution medium size, data rate or latency.

A title written according to the common format will also be platform independent, which means that it will play on any platform supporting the format. It is independent of platform characteristics such as processor choice or graphics system architecture, although there will be a minimum base level of capabilities specified by the common format standard below which a platform cannot support the common format.

To allow for upgrades and different performance-level models of a manufacturers products, titles written according to the format are scalable which means that they will play on a platform of any level of capability, provided that that platform supports the common format standard. A title must always be capable of running on a player with the base level of capabilities. Where more than base performance is available, then there will often be more application features or a higher level of presentation quality.

Whilst the above techniques allow developers to develop for one platform only and still have their applications run on many platforms, the method of code production does not always result in code that is as fast as the native code on a given platform. This may be due, for example, to differences between the number of registers of the virtual machine and those of the actual machine.

OBJECTS AND SUMMARY OF THE INVENTION

It is accordingly an object of the present invention to improve the efficiency of translation from virtual to native code in such situations, the improvement being in terms of fewer required processing operations to effect the translation and/or the reduction and/or avoidance of the delays associated with translation.

In accordance with the present invention there is provided a signal processing apparatus operable to receive a data signal comprised of a stream of program data encoded as virtual machine code according to a common data format supported by the apparatus, said apparatus further comprising: data processing means operable to process data encoded as a native machine code of the apparatus; and a translator arranged to receive the stream of virtual machine code data, to translate it to said native machine code, and pass it to said data processing means, wherein one or more pseudo-instructions are inserted in the stream, and the apparatus being configured to detect said pseudo-instructions and extract them from the stream, and said translation means being arranged to convert the virtual machine code into native machine code at least partially in response to information contained within said pseudo-instructions.

By the inclusion of the pseudo-instructions, which act as "hints" to the translator, a more efficient translation is enabled resulting in closer to native levels of efficiency, that is to say closer to the efficiency which would be expected for code written specifically for that apparatus.

The program data of the data stream may be encoded according to a predetermined coding scheme, such as MPEG for audio and/or video signals, with the data processing means of the said apparatus further comprising a decoder stage arranged to receive and decode the program data stream. The mode of supply of the program stream may vary (whilst remaining in compliance with the requirements of the common format) such that, for the receiving apparatus, the source of the stream of program data may comprise a removable storage device such as a conventional or high-density optical disc with the apparatus further comprising means operable to access data therefrom. Alternatively, the stream of program data may be supplied to the apparatus from a remote source via a data network, with the apparatus further comprising means for interfacing to such a network.

Also in accordance with the present invention, there is provided a method for encoding a stream of program data for supply to a signal processing apparatus of the type described, as well as a method for signal processing wherein a data signal comprised of a stream of program data encoded as virtual machine code according to a common data format is translated to a native machine code supported by an apparatus receiving the signal, wherein with one or more pseudo-instructions being inserted in the stream, said pseudo-instructions are detected and extracted from the stream, and the step of translation to convert the virtual machine code into native machine code occurs at least partially in response to information contained within the said pseudo-instructions.

The form taken by the pseudo-code instructions may vary. Whatever the form, however, they are linked by the feature of improving efficiency of the translation instruction. One or more of the pseudo-instructions may indicate the most likely one from a number of possible translation operations to occur subsequently such as to allow at least some of the process of translation to occur predictively rather than reactively, or an instruction may indicate that a given step in the translation is to be performed more than once (e.g. to avoid having to translate the instructions in a loop for every circuit of that loop).

Some of the pseudo-instructions may indicate that the translation operation for a segment of virtual machine code (as identified by that instruction) is to be optimised for speed at the expense of memory space required by the translated code, or optimised for memory space required by the translated code at the expense of speed of the translation operation. Such a pseudo-instruction "hint" enables localised optimisation for time- or space-critical segments of code without requiring the translator to be reset on a regular basis.

DETAILED DESCRIPTION OF THE PREFERRED EMBODIMENTS

In the following, describing the application of the invention to a system where data (such as audio and video) is recorded in a common format which is to be subsequently converted to a required machine code form, that form of the code produced in authoring will be referred to as common format code and the form to which it is translated at run time in the apparatus is referred to herein as native code.

Figure 1:
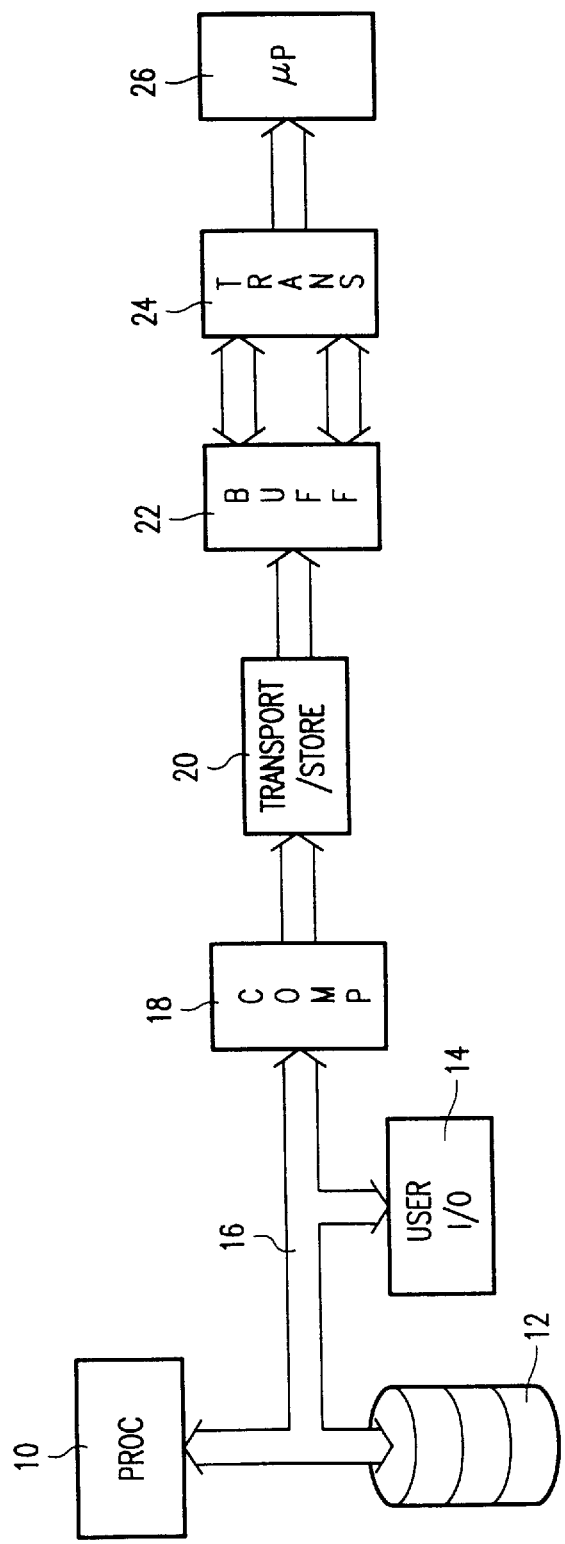
FIG. 1 is a block schematic diagram of a system according to the invention.

FIG. 1 shows generally at the left-hand side an authoring suite comprising a processor 10, mass data store 12 and user input/output means 14, linked by a suitable bus 16. The authoring suite is used to generate titles conforming to the common format and comprising both an application program and data for use by that program. The application program is in the form of a program for an imaginary virtual machine, the executable application program for which is delivered as one or more modules in the form of the binary representation of the common format (or virtual machine) code, the instruction set for the imaginary machine. The virtual machine is suitably specified as a 32-bit machine with 32 general purpose registers and 32 floating point registers, handling IEEE 32- and 64-bit formats(1 bit sign, 23 bits mantissa, 8 bits exponent, or 1 bit sign, 52 bits mantissa, 11 bits exponent respectively).

Having been assembled in the common format, a title is then compiled (at compiler 18) into the particular form required by the transport and/or storage medium 20 of choice. The medium may comprise a data network or may be in the form of a removable record carrier such as a conventional or high-density optical disc, with the compiler 18 handling any necessary mapping of data blocks required by the particular transport means.

At the consumer player end of the system, shown generally at the right-hand side of FIG. 1, the data from the transport and/or storage medium 20 is read to a local buffer memory 22 following which segments of the common format code are translated (at 24) into the instruction set of the consumer player host processor 26. This translation process is carried out as the program code modules are loaded and, because the code is translated rather than interpreted, the translated program will run at essentially full speed with no interruption overhead.

In order to improve the efficiency, the encoder compiler 18 is configured to generate and insert in the common format code stream a number of pseudo-instructions or "hints" which provide guidance to a decoder translator (e.g. 24) aimed at improving the speed or economy of translation to the native code.

Figure 2:
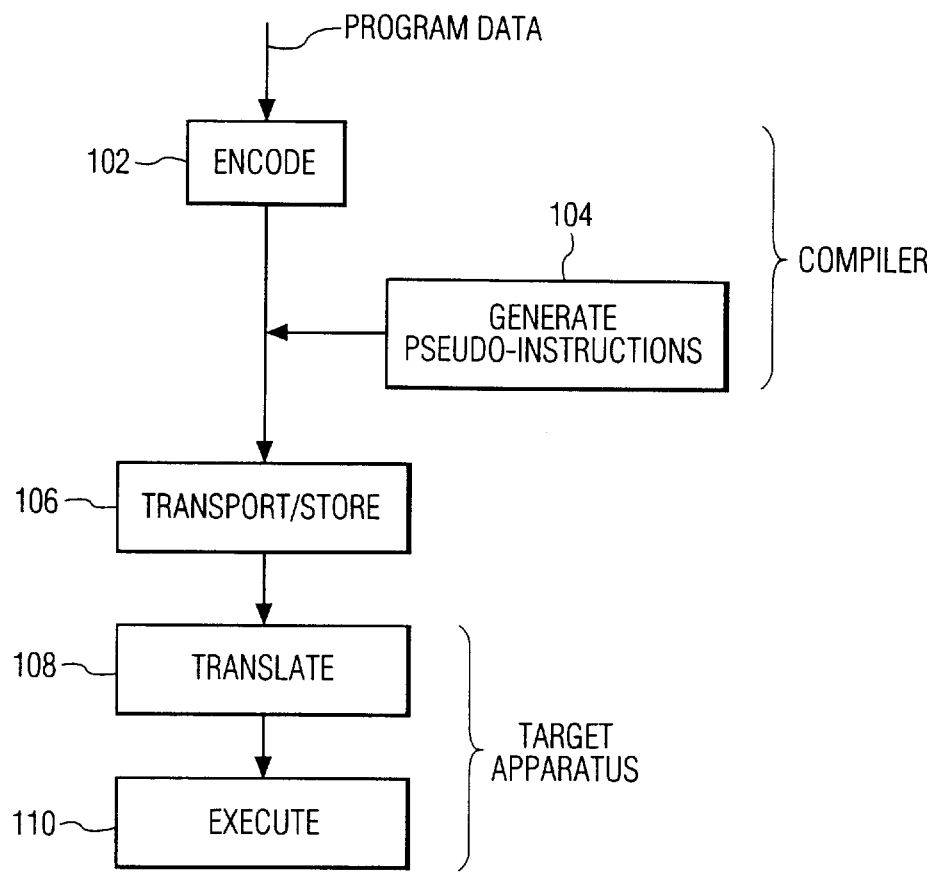
FIG. 2 is a flow diagram showing a division of steps in an embodiment of the invention.

The flow of this compilation and translation is shown in FIG. 2, where as a particular example the compiler is separate from the target apparatus. In step 102 the program data are encoded in a compiler to a common format code stream. In step 104 pseudo-instructions or hints are generated in the compiler, and inserted into the stream. In step 106 the stream is transported or stored, for use in the target apparatus, and other platforms which may be or become targets. In step 108 the stream is translated in the target apparatus, using the pseudo-instructions to improve efficiency of translation. In step 110, the program is executed in the target apparatus.

The following are examples of suitable hints which may be generated by the compiler or, although not shown, inserted by an author:

HOW_VITAL This informs the decoder translator stage 24 that a register of the native processor 26 is being heavily used in comparison with other registers, and consequently should remain readily available via one or more registers of the virtual machine until no longer needed. Separate forms of this hint are suitably provided for the fixed and floating point registers.

FINISHED_WITH This follows on from the HOW_VITAL hint and tells the translator that a particular register is no longer being used and need not be maintained in local store. As above, this hint is suitably provided in separate forms for the fixed and floating point registers.

PUSH_n This tells the translator that n words are going to be pushed onto a stack before the next application programming interface call. This allows processors without in-built stack operations (such as MIPS) to skip updating the stack pointer register after each push operation, they can just use a constant offset and update the register just before the API call. For this instruction to work safely, the assembler must check that there are no labels which may disrupt the sequence of words, and that n is correct. The translator should be able to assume that things are correct.

BRANCH_LIKELY This tells the translator that the conditional branch instruction following this hint is more likely to be taken than not.

BRANCH_UNLIKELY This is the opposite to the BRANCH_LIKELY hint above.

OPTIMISE_SPEED This hint (in the form of a pair of them in _START and _END configurations) surround a section of code that is speed critical: in such a case, the translator is configured to optimise the code as much as possible without taking undue notice of code size (this could include unrolling loops).

OPTIMISE_SPACE This hint (again in the form of a _START and _END pair) surrounds a section of code that is not at all speed critical and indicates to the translator that the code should be optimised to take up as little memory as possible, even if this slows it down a little.

It should be noted that these "hints" do not form a part of the code translated—instead they act to improve the efficiency of the translation process which process is not, in itself, rendered any more complex.

From reading the present disclosure, other modifications will be apparent to persons skilled in the art. Such modifications may involve other features which are already known in the field of data coding and transmission methods and apparatus and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A signal processing apparatus arranged to receive a data signal comprised of a stream of program data encoded as virtual machine code according to a common data format supported by the apparatus and playable on other platforms, said stream having one or more pseudo-instructions inserted therein including information, other than identification of registers, for improving efficiency of translating said stream, said apparatus comprising:

data processing means operable to process data encoded as a native machine code of the apparatus, and a translator arranged to receive said stream of virtual machine code data, to translate said stream to said native machine code, and pass the translated stream to said data processing means, the apparatus being configured to detect said pseudo-instructions and extract them from the stream, and said translation means being arranged to convert the virtual machine code into native machine code with efficiency improved at least partially in response to information contained within said pseudo-instructions.

2. A signal processing apparatus as claimed in claim 1, wherein the program data of said data stream is encoded according to a predetermined coding scheme, the data processing means of said apparatus further comprising a decoder stage arranged to receive and decode the program data stream.

3. A signal processing apparatus as claimed in claim 2, wherein the source of said stream of program data comprises a removable storage device and the apparatus further comprises means operable to access data therefrom.

4. A signal processing apparatus as claimed in claim 2, wherein said stream of program data is supplied to the apparatus from a remote source via a data network, and the apparatus further comprises means for interfacing to said network.

5. A signal processing apparatus as claimed in claim 1, wherein the source of said stream of program data comprises a removable storage device and the apparatus further comprises means operable to access data therefrom.

6. A signal processing apparatus as claimed in claim 1, wherein said stream of program data is supplied to the apparatus from a remote source via a data network, and the apparatus further comprises means for interfacing to said network.

7. An apparatus as claimed in claim 1, characterized in that said pseudo-instructions include information concerning determination of branch selection likelihood.

8. An apparatus as claimed in claim 1, characterized in that said pseudo-instructions include information concerning stack usage optimization.

9. A method of encoding a stream of program data for supply to a signal processing apparatus arranged to receive a stream of program data encoded as virtual machine code according to a common data format supported by the apparatus and playable on other platforms, said stream having one or more pseudo-instructions inserted therein, wherein the apparatus comprises means for processing data encoded as a native machine code of the apparatus, means for detecting said pseudo-instructions and extracting them from the stream, and a translator, the translator being arranged to receive the stream of virtual machine code, to translate said stream to said native machine code at least partially in response to information contained within said pseudo-instructions, and to pass the translated stream to said means for processing data, said method comprising:

encoding the stream as virtual machine code according to said common data format, and inserting in the stream said pseudo-instructions for governing at least partially the translation of said virtual machine code to said native machine code, wherein said pseudo-instructions include information, other than identification of registers, for improving efficiency of translating said stream.

10. A method as claimed in claim 9, wherein one or more of the pseudo-instructions indicates the most likely one from a number of possible translation operations to occur subsequently.

11. A method as claimed in claim 9, wherein one or more of the pseudo-instructions indicates that the translation operation for a segment of virtual machine code identified by the instruction is to be optimised for speed at the expense of memory space required by the translated code.

12. A method as claimed in claim 9, wherein one or more of the pseudo-instructions indicates that the translation operation for a segment of virtual machine code identified by the instruction is to be optimised for memory space required by the translated code at the expense of speed of the translation operation.

13. A method as claimed in claim 9, wherein one or more of the pseudo-instructions indicates that a particular translation operation is to be performed two or more times in succession.

14. A method of signal processing comprising:

providing a data signal comprising a stream of program data encoded as virtual machine code according to a common data format playable on a plurality of platforms, inserting in said stream one or more pseudo-instructions including information, other than identification of registers, for improving efficiency of translating said stream, detecting and extracting said pseudo-instructions from the stream, and translating said stream, at least partially in response to information contained within said pseudo-instructions, to a native machine code supported by an apparatus to which said stream is provided.

15. A method as claimed in claim 14, wherein one or more of the pseudo-instructions indicates the most likely one from a number of possible translation operations to occur subsequently.

16. A method as claimed in claim 14, wherein one or more of the pseudo-instructions indicates that the translation operation for a segment of virtual machine code identified by the instruction is to be optimised for speed at the expense of memory space required by the translated code.

17. A method as claimed in claim 14, wherein one or more of the pseudo-instructions indicates that the translation operation for a segment of virtual machine code identified by the instruction is to be optimised for memory space required by the translated code at the expense of speed of the translation operation.

18. A method as claimed in claim 14, wherein one or more of the pseudo-instructions indicates that a particular translation operation is to be performed two or more times in succession.

19. A method as claimed in claim 14, characterized in that said pseudo-instructions are hints providing guidance to a decoder translator for optimizing translation to the native machine code.

* * * * *